US009910790B2

(12) United States Patent
Yap et al.

(10) Patent No.: US 9,910,790 B2
(45) Date of Patent: Mar. 6, 2018

(54) USING A MEMORY ADDRESS TO FORM A TWEAK KEY TO USE TO ENCRYPT AND DECRYPT DATA

(71) Applicant: INTEL CORPORATION, Santa Clara, CA (US)

(72) Inventors: Kirk S. Yap, Framingham, MA (US); Gilbert M. Wolrich, Framingham, MA (US); Vinodh Gopal, Westborough, MA (US); Wajdi K. Feghali, Boston, MA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/105,061

(22) Filed: Dec. 12, 2013

(65) Prior Publication Data

US 2015/0169472 A1 Jun. 18, 2015

(51) Int. Cl.
*G06F 12/14* (2006.01)

(52) U.S. Cl.
CPC ...... *G06F 12/1408* (2013.01); *G06F 12/1466* (2013.01); *G06F 2212/1052* (2013.01)

(58) Field of Classification Search
CPC ...... G06F 12/1408; G06F 21/72; G06F 21/14; G06F 12/1466
See application file for complete search history.

(56) References Cited

U.S. PATENT DOCUMENTS

| 6,115,323 | A | * | 9/2000 | Hashimoto | G11C 8/12 365/230.06 |
| 8,036,377 | B1 | * | 10/2011 | Poo | H04L 9/0631 380/28 |
| 8,526,605 | B2 | * | 9/2013 | Matthews, Jr. | G06F 12/1408 380/277 |
| 8,798,262 | B1 | * | 8/2014 | Raizen | G06F 21/78 380/277 |
| 2005/0185482 | A1 | * | 8/2005 | Sugimoto | G11C 29/81 365/200 |
| 2009/0006756 | A1 | * | 1/2009 | Donley | G06F 12/0846 711/128 |

(Continued)

OTHER PUBLICATIONS

Huang, M., et al., "Efficient Cache Design for Solid-State Drives", In Proceedings of the 7th ACM International Conference on Computing Frontiers, 2010, 10 pp.

(Continued)

*Primary Examiner* — John B King
*Assistant Examiner* — Darshan Dhruv
(74) *Attorney, Agent, or Firm* — Konrad Raynes Davda & Victor LLP; David W. Victor

(57) ABSTRACT

Provided are a memory system, memory controller, and method for using a memory address to form a tweak key to use to encrypt and decrypt data. A base tweak co is generated as a function of an address of a block of data in the memory storage. For each sub-block of the block, performing: processing the base tweak to determine a sub-block tweak; combining the sub-block tweak with the sub-block to produce a modified sub-block; and performing an encryption operation comprising one of encryption or decryption on the modified sub-block to produce sub-block output comprising one of encrypted data and unencrypted data for the sub-block.

22 Claims, 6 Drawing Sheets

(56) References Cited

U.S. PATENT DOCUMENTS

| | | | | |
|---|---|---|---|---|
| 2009/0060197 | A1* | 3/2009 | Taylor | H04L 9/0618 380/277 |
| 2009/0268903 | A1* | 10/2009 | Bojinov | G06F 3/0622 380/45 |
| 2010/0030948 | A1* | 2/2010 | Moon | G06F 12/0246 711/103 |
| 2010/0031057 | A1* | 2/2010 | Beaver | H04L 9/0894 713/193 |
| 2011/0085657 | A1* | 4/2011 | Matthews, Jr. | G06F 12/1408 380/28 |
| 2011/0123020 | A1* | 5/2011 | Choi | H04L 9/0637 380/28 |
| 2011/0255689 | A1* | 10/2011 | Bolotov | H04L 9/0631 380/42 |
| 2012/0079285 | A1* | 3/2012 | Gueron | G06F 12/1408 713/190 |
| 2012/0278635 | A1* | 11/2012 | Hars | G06F 12/14 713/193 |
| 2013/0054934 | A1* | 2/2013 | Mitsugi | G06F 12/1408 711/203 |
| 2014/0223197 | A1* | 8/2014 | Gueron | G06F 21/72 713/193 |
| 2015/0006910 | A1* | 1/2015 | Shapiro | G06F 12/1408 713/190 |
| 2015/0341166 | A1* | 11/2015 | Minematsu | H04L 9/0625 380/28 |

OTHER PUBLICATIONS

Owen, D., Jr., "The Feasibility of Memory Encryption and Authentication", Apr. 21, 2013, 32 pp.

Peterson, P.A.H., "Cryptkeeper: Improving Security with Encrypted RAM", In Proceedings of the 2010 IEEE International Conference on Technologies for Homeland Security (HST), Nov. 2010, 7 pp.

Subashri, T., et al., "Pipelining Architecture of AES Encryption and Key Generation with Search Based Memory", International Journal of VLSI Design & Communication Systems (VLSICS), vol. 1, No. 4, Dec. 2010, 13 pp.

Wikipedia, "Advanced Encryption Standard", [online], last modified on Dec. 6, 2013, [Retrieved on Dec. 12, 2013], retrieved from the Internet at <URL: http://en.wikipedia.org/w/index.php?title=Advanced_Encryption_Standard&oldid=584804251>, 10 pp.

* cited by examiner

USING A MEMORY ADDRESS TO FORM A TWEAK KEY TO USE TO ENCRYPT AND DECRYPT DATA

TECHNICAL FIELD

Embodiments described herein generally relate using a memory address to form a tweak key to use to encrypt and decrypt data.

BACKGROUND

A memory controller interfaces between the computer system and a memory storage array to manage Input/Output (I/O) operations with respect to the memory storage array. The memory controller may map a logical-to-physical address when determining an address in the memory device at which to write the data and map a physical-to-logical address when returning data for a requested logical address.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Described embodiments provide techniques to encrypt and decrypt data for a memory system in a manner that avoids latency delays and uses an address of the data block in a memory device to read/write to generate different tweaks to combine with sub-blocks of the block to produce a modified sub-block data to encrypt or decrypt. A different tweak, which may be encrypted, may be generated for each sub-block of the block to combine with the sub-block of data before performing the encryption/decryption.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage devices electronic assemblies. Embodiments include both devices and methods for forming electronic assemblies.

Figure 1:
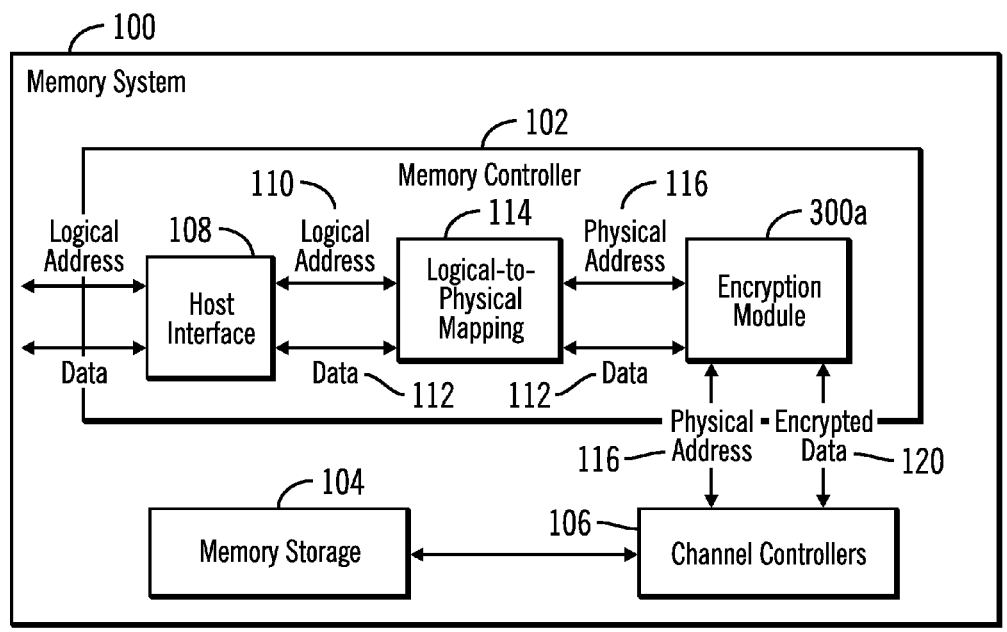
FIGS. 1 and 2 illustrate embodiments of a memory system.

FIG. 1 illustrates an embodiment of a memory system 100 including a memory controller 102 to perform read and write operations with respect to a memory storage 104 of electrically erasable and non-volatile memory cells. The controller 102 may communicate with the storage memory array 104 through one or more channel controllers 106 to allow multiple channels of simultaneous access to the cells in the array 104. The controller 102 includes a host interface 108 to receive and transmit blocks of data with respect to an external component on a bus. The memory controller 102 receive a logical address 110 and block of data 112 at the logical address 110 that maps to a physical address in the storage array 104. A logical-to-physical mapping component 114 maps the logical address 110 to a physical address 114 in the memory storage array 104 and inputs the physical address 116 and the data 110 for the physical address 116 to an encryption module 300a which uses the physical address 116 to encrypt the data 112 to produce encrypted data 120 to store in the memory storage array 104. The channel controllers 106 allow parallel processing of Input/Output (I/O) commands. For example, a first controller 106 may read and write data while the second controller 106 prepares for the next access to eliminate the reset and setup delays that occur before the first channel controller 106 may begin the read/write process all over again. The encryption module 300a may further receive read encrypted data 120 and decrypt producing clear data 112 provided to the logical-to-physical mapping component 114 to produce the corresponding logical address 110 that may be returned with the clear data 112 to a read request.

The memory storage 104 may comprise a flash storage device, such as a NAND flash memory, and other storage and memory devices, such as ferroelectric random-access memory (FeTRAM), nanowire-based non-volatile memory, three-dimensional (3D) crosspoint memory such as phase change memory (PCM), memory that incorporates memresistor technology, Magnetoresistive random-access memory (MRAM), Spin Transfer Torque (STT)-MRAM, a single level cell (SLC) Flash memory and other electrically erasable programmable read only memory (EEPROM) type devices. In an alternative embodiment, the memory storage 104 may comprise a volatile memory such as a Dynamic Random Access Memory (DRAM), a synchronous DRAM (SDRAM), etc.

Figure 7:
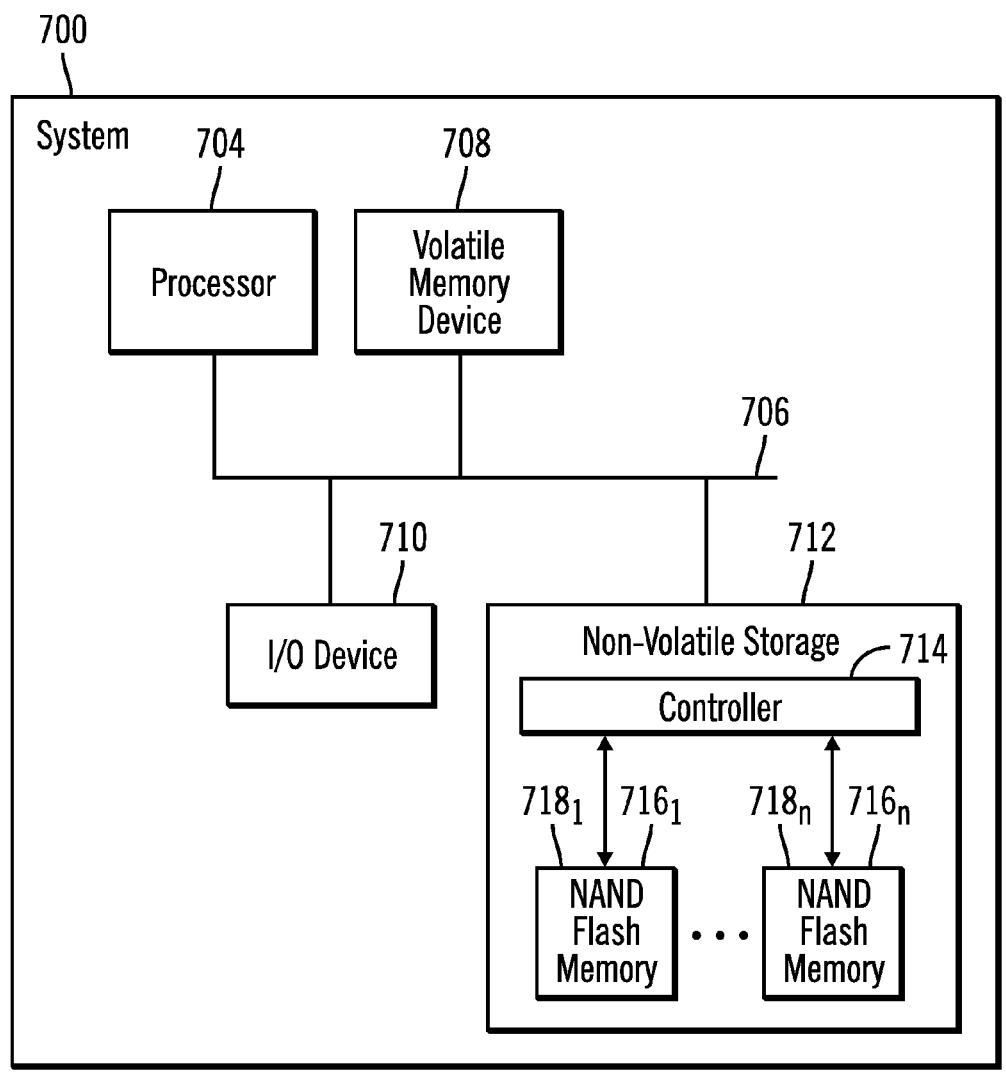
FIG. 7 illustrates a system in which the memory system may be deployed.

In certain embodiments, the memory controller 102 and the memory storage array 104 may communicate over a bus interface 116, 120, 216, 220, and the memory controller 102, 202 may be implemented in integrated circuits on the motherboard. The memory controller 102, 202 and/or the memory storage array 104, 204 may be integrated with a separate process or be implemented in logic separate from a processor on a system motherboard such as shown in FIG. 7.

Figure 2:
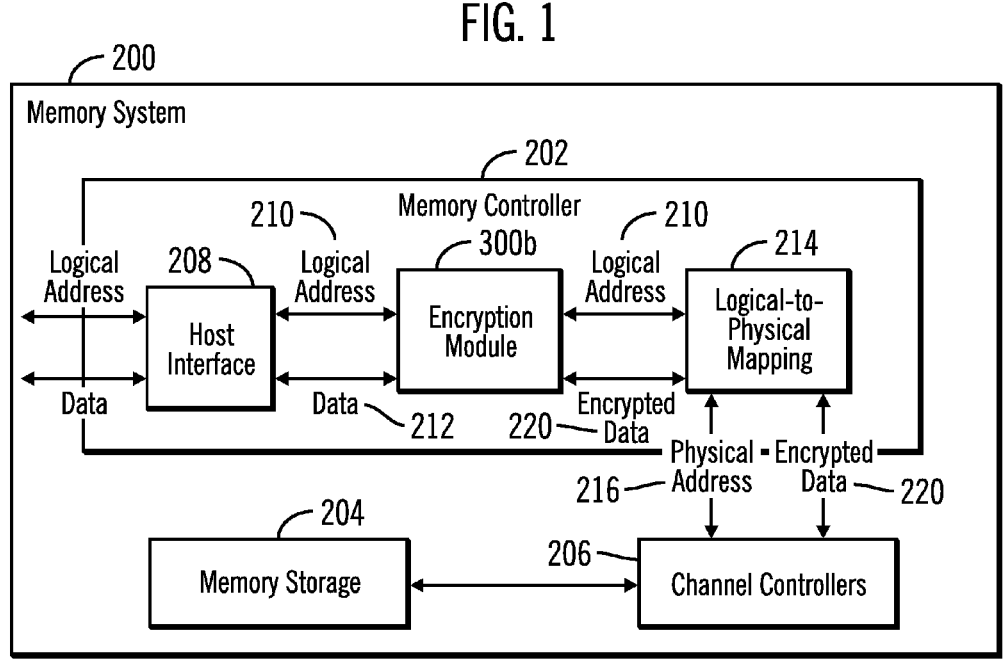

FIG. 2 illustrates a memory system 200 comprising an alternative embodiment of the memory system 100 of FIG. 1, where the components 202, 204, 206, 208, 210, 212, 214, 216, 300b, 220 comprise the same components 102, 104, 106, 108, 110, 112, 114. 116, 300a, 120 in a different arrangement where the encryption module 300b differs from encryption module 300a in that module 300b uses the logical address 210 to encrypt the data 212, such that the encryption module 300b performs encryption before the logical-to-physical mapping 214 and decryption after the mapping 214. If encryption and decryption occur based on the logical address 210, as shown in FIG. 2, then for non-volatile storage embodiments, such as SSDs, the non-volatile memory controller 202 may utilize wear-leveling algorithms to change the physical address at which the encrypted data 220 is stored because the logical-to-physical 214 mapping occurs after encryption.

Figure 3:
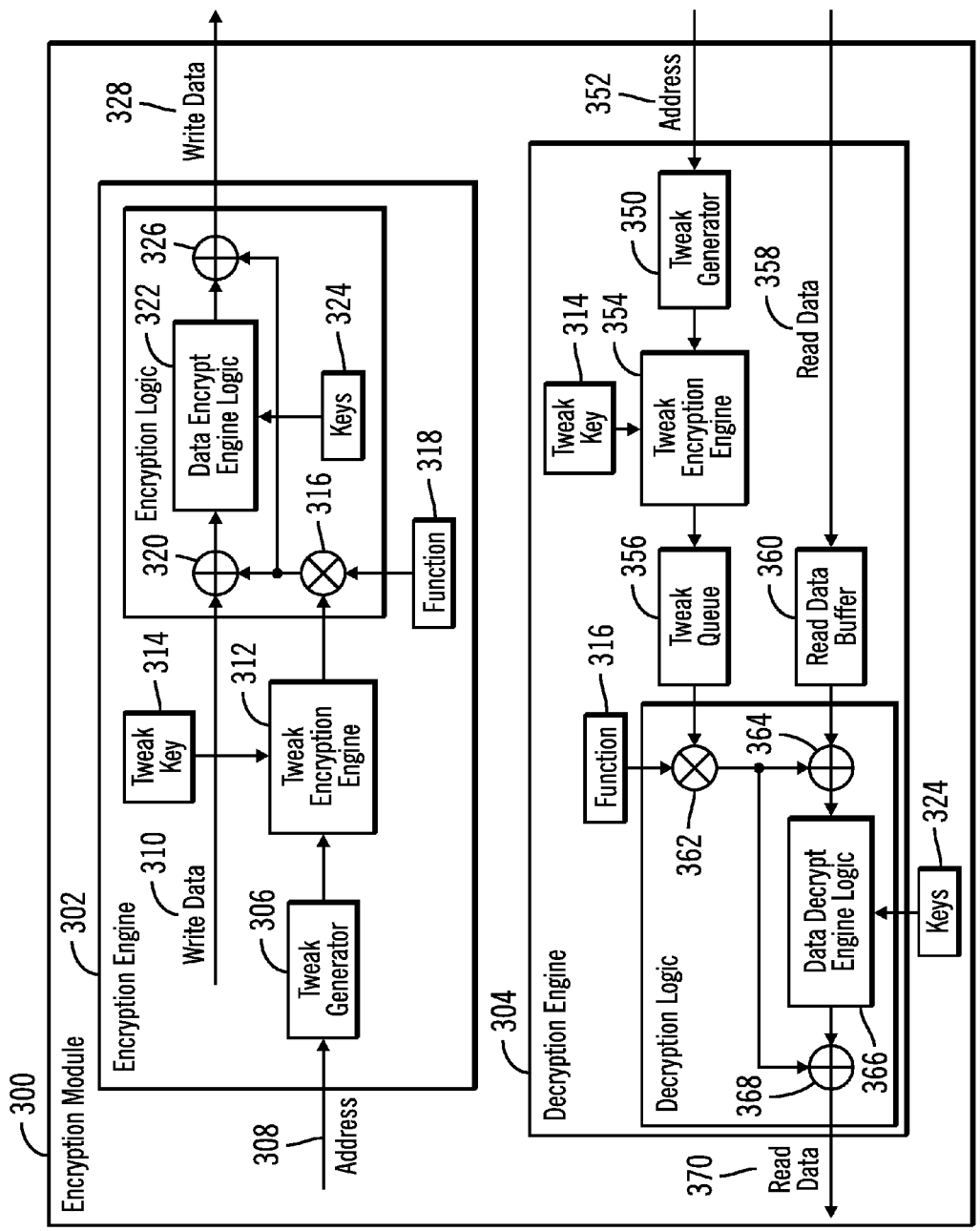
FIG. 3 illustrates an embodiment of an encryption engine to perform encryption and decryption operations with respect to the memory system.

FIG. 3 illustrates an embodiment of an encryption module 300, comprising an implementation of the encryption modules 300a, 300b, that performs encryption and decryption using the logical or physical address of the data in the memory storage array 104, 204. In one embodiment, the encryption module 300 includes separate logic for an encryption engine 302 and a decryption engine 304. The encryption engine 302 includes a tweak generator 306 that generates a base tweak based on an address 308 (logical or physical address 116, 210) of the write data 310 being received. In one embodiment, the tweak generator 306 generates a value based on a channel address concatenated with the logical or physical address for the data and padded with zeros to form a fixed bit length base tweak for encryption, such as 128 bits. Other techniques may be used to generate the base tweak from the address. The tweak encryption engine 312 then generates an encrypted base tweak having a bit length, e.g., 128 bits, using a tweak key 314 and an algorithm such as Advanced Encryption Standard (AES) 256 or other suitable encryption algorithms known in the art. The encrypted base tweak is then provided to a multiplier 316 or other logic unit to combine with a function 316 to produce a modified base tweak.

In one embodiment, the function 318 may take as a parameter a consecutive number, e.g., 0, 1, 2, 3, of a sub-block for the data at the address 308. For instance, for a 64 byte block at the memory address, each sub-block of the block on which the encryption module 300 operates may comprise a 16 byte block, so the four possible parameters are 0, 1, 2, 3 that would be used to be inputted to the function 318 whose output is multiplied with the encrypted base tweak.

The function 318 is applied to the encrypted base tweak, which takes as a parameter, the number of the sub-block at the address being encrypted or decrypted, may not modify the encrypted base tweak for the first sub-block and may modify the encrypted base tweak for the sub-block following the first sub-block so as to produce a different modified encrypted base tweak for each of the sub-blocks at the address. The tweaks for the remaining 16 B blocks (blocks 2,3,4) may be derived from the base tweak by performing modular multiplication. In one embodiment, the function 316 provides a modular multiplication of two polynomials over the binary Galois Field of two elements modulo $x^{128}+x^7+x^2+x+1$. One of the polynomials may be represented by the 16 B base tweak serving as coefficients of the polynomial and the other is the polynomial $x^j$, where j is the block number. Multiplication by the polynomial x, which is 2, is shifting the 128 bit value to the left by 1 position and conditionally XOR'ing with the constant 0x87 if the most significant bit[127] is set. Since the tweak requires one 128 bit (16 B) encryption of an address for every four 16 B data blocks, the AES tweak has less of a throughput requirement than the data encryption/decryption. In alternative embodiments, different modular multiplication polynomials may be used or different functions or techniques to vary or offset the base tweak based on the number of the sub-block of the block at the address 308.

The modified encrypted base tweak from multiplier 316 may then be supplied to the logic unit 320, such as an adder, to combine, e.g. XOR, with one of the sub-blocks of the write data 310 and then supply to the data encrypt engine logic 322, which performs encryption using the AES or other suitable algorithm known in the art. In one embodiment, the encrypt engine logic 322 may use one of multiple keys 324, where there may be multiple keys for different memory regions of the memory storage 104, 204. The data encrypt logic 322 outputs encrypted output for a sub-block to the adder 326 which then combines, e.g., XORs, the encrypted output with the encrypted base tweak, which was also applied at adder 320. In certain embodiments, the encrypted base tweak may be modified by applying a function using as a parameter the number of the block at the address to vary the encrypted base tweak combined at the adders 320, 326. This produces the final encrypted sub-block output or encrypted write data 328 written to the memory storage array 104, 204.

The decryption engine 304 includes a tweak generator 350 to generate a base tweak based on an address 352 (logical or physical address 116, 210). The tweak generator 350 may perform the same operations as the encryption tweak generator 306 to generate a base tweak. The tweak encryption engine 354 then generates an encrypted base tweak and may use the same encryption technique and tweak key 314 used by the encryption tweak encryption engine 312. The encrypted base tweak is stored in a tweak queue 356 to be made available for combining with different sub-blocks to decrypt. Further, the encrypted sub-blocks of the read data 358 for the address 352 is buffered in a read data buffer 360. The tweak queue 356 provides the encrypted base tweak to a logic unit 362, such as a multiplier, to apply the function 318 as described with respect to the encryption engine 302, such as module multiplication function, to produce the modified encrypted subsequent tweak, which is provided to the to the adder 364 to combine, e.g., XOR, with the encrypted subsequent sub-block of read data 358 from the read data buffer 360, to produce a modified encrypted subsequent sub-block that is then supplied to data decrypt engine logic 366 to use one of the keys 324 to decrypt the data 358 encrypted according to the data encrypt engine logic 322 using the same key 324.

The data decrypt logic 366 outputs decrypted sub-block output to the adder 368 which then combines, e.g., XORs, the decrypted sub-block output with the modified encrypted subsequent tweak, which was also applied at adders 316, 320, 362. This produces the final decrypted sub-block of clear read data 370 that is returned to the host interface 108, 208 to return to the read request. The logic units 316, 320, 326, 362, 364, and 368 described as performing adding (XOR) and multiplication (AND) may perform other logical operations on their input than described.

In the embodiment of FIG. 3, the encryption module 302 and decryption module 304 are implemented in separate logical units. In an alternative embodiment, the operations for the modules 302 may be implemented in the same logic components.

Figure 4:
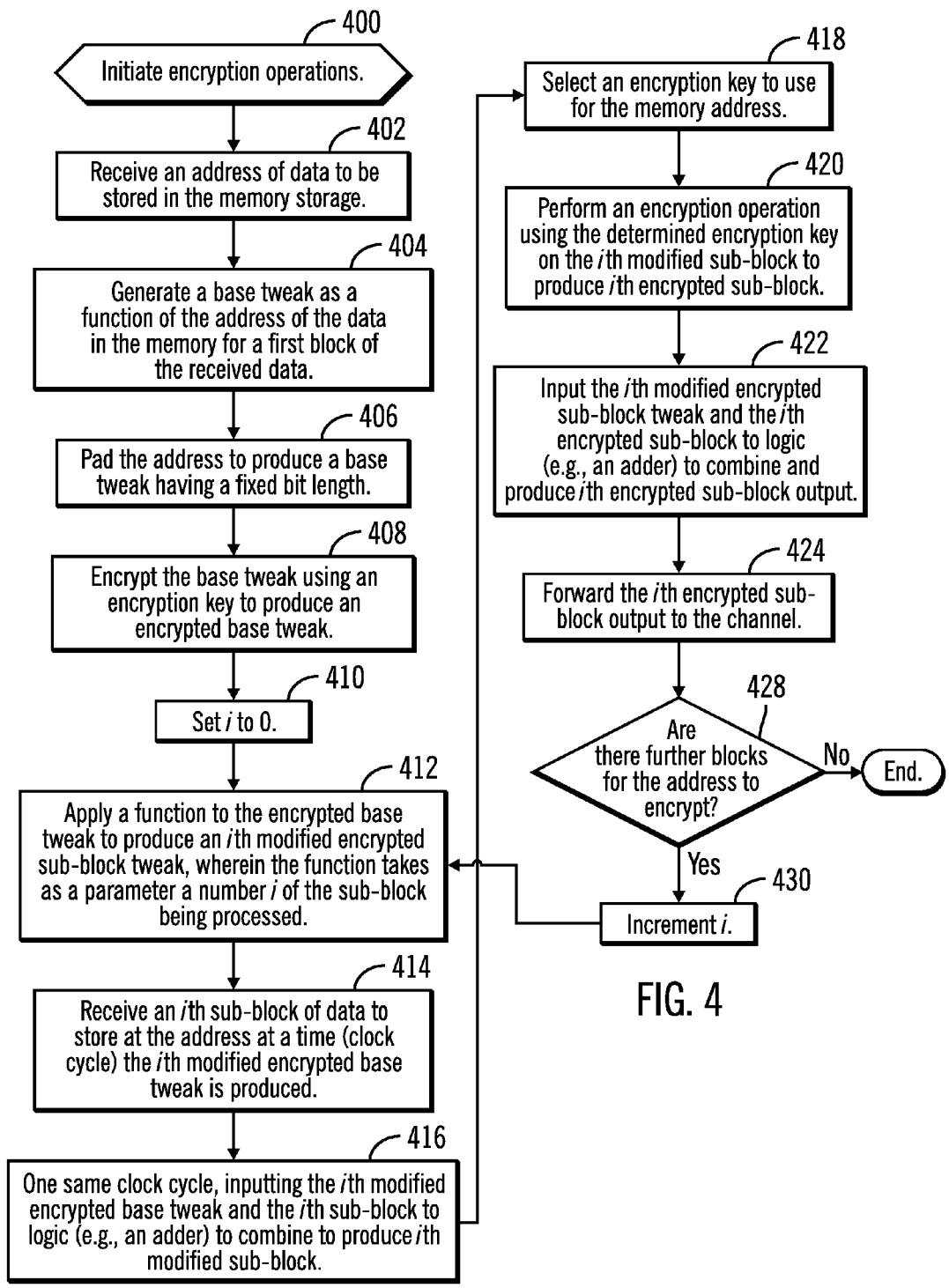
FIG. 4 illustrates an embodiment of operations to encrypt data to write to a memory device.

FIG. 4 illustrates an embodiment of operations performed by the encryption engine 302 to encrypt data for the memory storage 104, 204. Upon initiating (at block 400) encryption operations, the tweak generator 306 receives (at block 402) an address of data to be stored in the memory storage 104, 204 and generates (at block 404) a base tweak as a function of the address of the data in the memory for a first sub-block of the received data. In one embodiment, the tweak generator 306 may pad (at block 406) a concatenation of the channel address of the channel controller 106, 206 for the memory address and the physical or logical address with zeros to reach a fixed bit length, e.g., 128. A tweak encryption engine 312 encrypts (at block 408) the modified base tweak using a tweak encryption key 314 to produce an encrypted base tweak. A variable i is set (at block 410) to 0 for the first sub-block to encrypt. The encrypted base tweak is then supplied to an multiplier 316 so that a function 318 is applied (at block 412) to the encrypted base tweak to produce an ith modified encrypted sub-block tweak, also referred to as a sub-block tweak for sub-block i of the block at the memory address. The function may take as a parameter a number i of the sub-block being processed. The function 318 may comprise modular multiplication using two or more polynomials. In one embodiment, the application of the function 318 produces a different value from the encrypted base tweak for each of the sub-blocks. In one embodiment, the first modified encrypted sub-block tweak may comprise the encrypted base tweak, and the subsequent modified sub-block tweaks for subsequent sub-blocks may differ. At a same time that the modified encrypted sub-block tweak is supplied to the adder 320, such as on a same clock cycle, the ith sub-block of data to store at the address is received (at block 414) and inputted to the adder 320 to combine (at block 416) to produce an ith modified sub-block.

The data encrypt engine logic 322 selects (at block 418) a key 324 to use to encrypt (at block 420) the ith modified sub-block from the adder 320 to produce the ith encrypted sub-block of encrypted data, which is then inputted (at block 422) to logic (e.g., adder 326) to combine with the ith modified encrypted sub-block tweak to produce ith encrypted sub-block output, which is then forwarded (at block 424) to the channel controllers 106, 206 to write to the memory storage array 104, 106.

If (at block 428) there are further sub-blocks for the address 308 to encrypt, then i is incremented (at block 43) to encrypt the next subsequent sub-block for the address 308 and control proceeds back to block 412 to encrypt the next ith subsequent sub-block. Otherwise, if there are no further sub-blocks for the address to encrypt, control ends.

Figure 5:
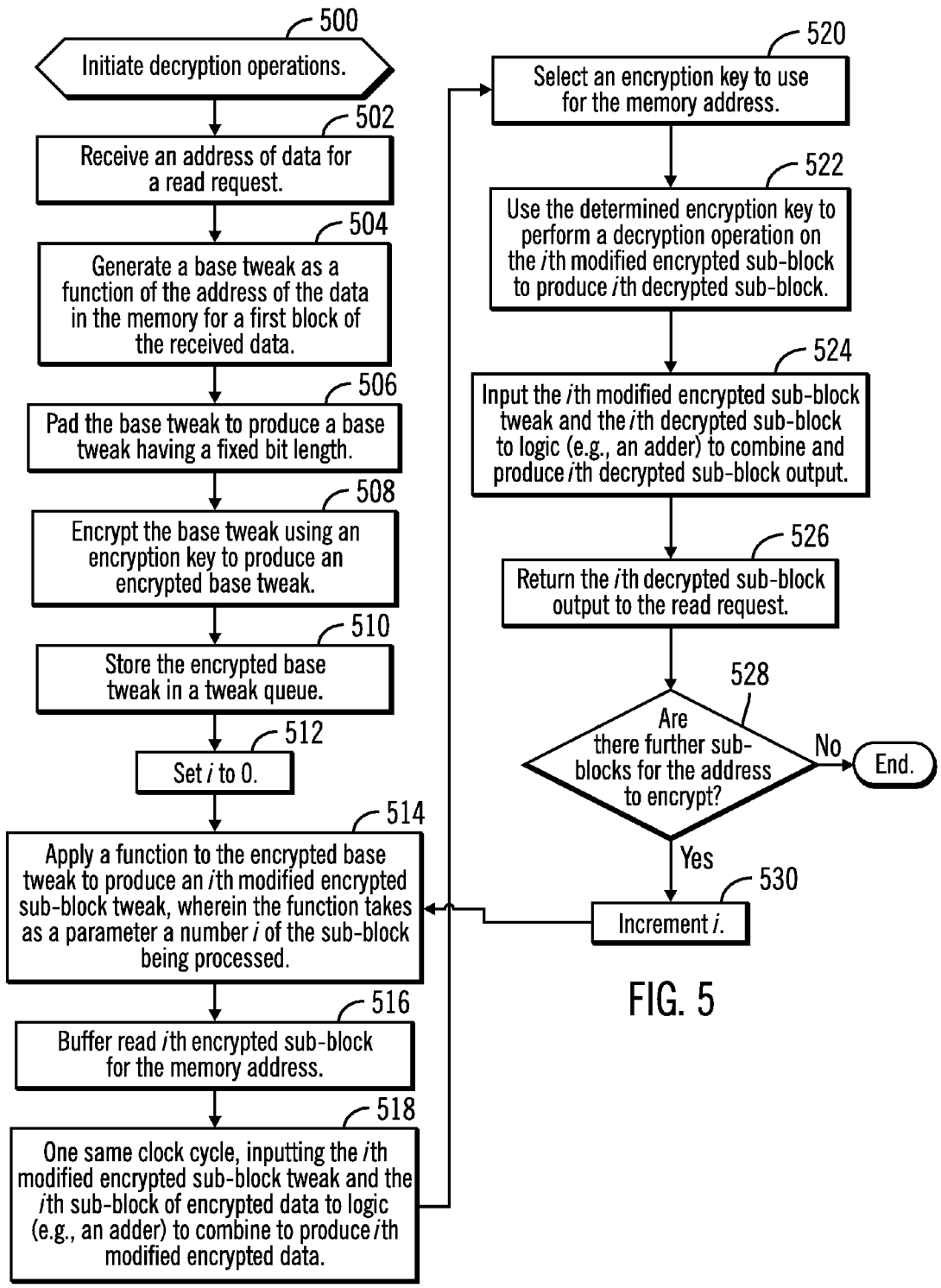
FIG. 5 illustrates an embodiment of operations to decrypt data from the memory device to return to a read request.

FIG. 5 illustrates an embodiment of operations performed by the decryption engine 304 to decrypt data from the memory storage array 104, 106 for a block at a requested address 352. Upon initiating (at block 500) decryption operations, an address 352 for a read block of data is received (at block 502). The tweak generator 352 generates (at block 504) a base tweak as a function of the address of the data to read in the memory, which may comprise the same base tweak generated by the encryption tweak generator 306. The base tweak, comprising a logical or physical address concatenated with the channel address, may be padded (at block 506), as performed by the encryption tweak generator 306. The tweak encryption engine 354 encrypts (at block 508) the base tweak using the tweak key 314 to produce an encrypted base tweak, just as the encryption tweak encryption engine 312 would, and stores (at block 510) the encrypted base tweak in the tweak queue 356. A variable i is set (at block 512) to 0 for the first sub-block to decrypt. The encrypted base tweak is then supplied to a multiplier 362 so that a function 318 is applied (at block 514) to the encrypted base tweak to produce an ith modified encrypted sub-block tweak, such as performed with respect to the encryption engine 302. The read ith encrypted sub-block for the memory address is buffered (at block 516) in the read buffer 360. At a same time that the ith modified encrypted sub-block tweak is supplied to the adder 364, such as on a same clock cycle, data for the ith sub-block of encrypted read data is inputted (at block 518) from the buffer 360 to the adder 364 to combine, e.g., XOR, to produce ith modified encrypted data.

The data decrypt engine logic 364 selects (at block 520) a key 324 to use to decrypt (at block 522) the ith modified encrypted sub-block to produce the ith sub-block of decrypted data, which is then inputted (at block 524) to logic (e.g., adder 366) to combine and produce ith decrypted sub-block of the decrypted data for the address 352, which is then returned (at block 526) as clear decrypted data for the ith sub-block of the read request. The key 324 selected at block 520 may comprise the same key 324 selected to encrypt the data.

If (at block 528) there are further sub-blocks for the address 352 to decrypt, then i is incremented to decrypt the next sub-block for the address 352 at block 514 et seq. Otherwise, if (at block 546) there are no further blocks to encrypt, control ends.

In one embodiment, the tweak queue 356 may store the encrypted base tweak for only one channel 106, 206. In a multi-channel system having multiple channel controllers 106, 206, the tweak queue 356 may store encrypted base tweaks for multiple channels and index the encrypted base tweaks by channel. In this way, when a sub-block is received for a channel, the tweak queue 356 selects the encrypted base tweak for the channel on which the sub-block was received. When the block read accesses are not initiated in request order due to conflicts or multi-channel memory systems, the encrypted base tweak may be provided out of order for different blocks from different channels.

In one embodiment, operations may be timed in the encryption module 300, so that before the write data 310 is received, the tweak encryption engine 312 generates the encrypted base tweak and inputs to the multiplier 316 on a cycle before the write data is received so on the next cycle the modified encrypted base tweak and the write data 310 are provided to the logic 320 to produce the modified sub-block. Further, with the decrypt logic, the operations of the tweak encryption may be detached from the read flow to ensure minimal latency while the tweak key and data is being presented by providing the sub-block to a read data buffer 360 to store the sub-block while the encrypted base tweak is being presented and applied to the multiplier 362 so that when the modified encrypted base tweak is produced from logic 362, the encrypted data is inputted to the logic 364 on the same clock cycle. In this way, the tweak generation process is detached from the read flow to ensure minimal latency impact to read transactions.

Figure 6:
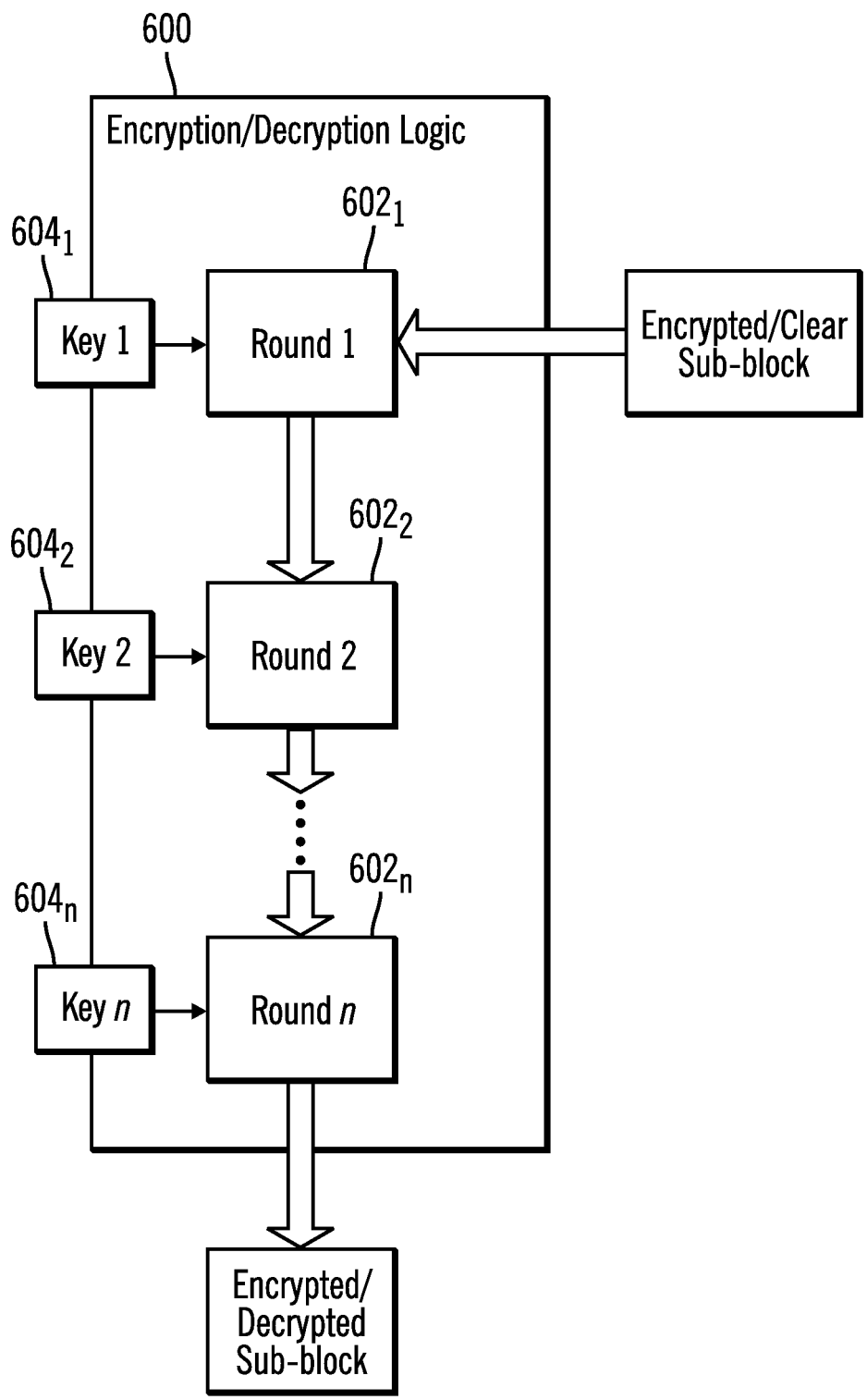
FIG. 6 illustrates an embodiment of an encryption/decryption engine with multiple sub-engines implemented to allow parallel processing of data to encrypt/decrypt.

The tweak encryption engines 312 and 354 and encryption 322 and decryption 366 logic may include multiple rounds of encryption operations modifying the data to encrypt or decrypt. To avoid latency delays for processing within the tweak and data encryption engines, FIG. 6 provides an alternative implementation of the encryption/decryption logic 600, such as encryption engines 312, 322, 354, 366, as having multiple instantiations $602_1$, $602_2$ ... $602_n$ of the engine to allow parallel processing of the encrypted base tweak and encryption/decryption of the data in the different engines to minimize the delay from the rounds performed in the encryption engine 600 and provide a fully pipelined implementation.

For instance, AES-256 requires 14 "rounds" of processing for each encryption block, where a round consists of:

1. SubBytes—a non-linear substitution step where each byte is replaced with another according to a lookup table.
2. ShiftRows—a transposition step where each row of the state is shifted cyclically a certain number of steps.
3. MixColumns—a mixing operation which operates on the columns of the state, combining the four bytes in each column.
4. AddRoundKey The complexity of AES round processing results in a critical path such that one or at most two rounds can be processed within a clock cycle, such that the throughput requirement for memory accesses requires pipelined processing of the 14 rounds of an encryption block. The embodiment of FIG. 6 minimizes this latency by providing a pipelined implementation having separate logic for each round $602_1$, $602_2$ ... $602_n$ of encryption operations performed by the encryption decryption logic 600, such as the encrypt 322 and decrypt 366 engine logic units in FIGS. 2 and 3. Each round $602_1$, $602_2$ ... $602_n$ may independently execute and perform one or more rounds of encryption/decryption operations on a different input sub-block 606 of data to encrypt or decrypt. A sub-block 606 may be inputted into the pipeline $602_1$, $602_2$ ... $602_n$ after the first round $602_1$ completes processing a sub-block. In this way, the latency comprises the number of cycles to perform one of the rounds $602_1$, $602_2$ ... $602_n$, as opposed to the number of cycles to perform all rounds $602_1$, $602_2$ ... $602_n$. Thus, as one encrypted/decrypted sub-block 608 is outputted from the final round $602_n$, a new sub-block 606 may be inputted at the first round $602_1$ to fill the pipeline.

With the embodiment of FIG. 6, blocks may move in a pipelined process such that while one sub-block is being processed in one round, another sub-block may be processed in a previous or subsequent round $602_1$, $602_2$ ... $602_n$. This optimizes operations, because the delay between completing the encryption/decryption of each block is the number of clock cycles to perform each round $602_1$, $602_2$ ... $602_n$.

Further, in the embodiment of FIG. 6, one or more of the rounds $602_1$, $602_2$ ... $602_n$ may receive a same or different key $604_1$, $604_2$ ... $604_n$ to perform the encryption/decryption operations at the round $602_1$, $602_2$ ... $602_n$ for the blocks being processed at the rounds.

FIG. 7 illustrates an embodiment of a system 700 having a processor 704 that communicates over a bus 706 with a volatile memory device 708 in which programs, operands and parameters being executed are cached and the non-volatile storage device 702, in which data and programs may be stored. The processor 700 may also communicate with Input/Output (I/O) devices 710, such as input devices, display devices, graphics cards, ports, network interfaces, etc., and a non-volatile storage 712, such as a solid state storage device (SSD) including a controller 714 that manages access to NAND flash memory devices $716_1$ ... $716_n$ over channels $718_1$ ... $718_n$. The non-volatile storage 712 may comprise the memory system described with respect to FIGS. 1-6.

With described embodiments, total memory encryption of any persistent memory may be provided at cache-line granularity using an encryption module 300 logic physically resident in the memory controller 102, 202. Further, separate encryption 302 and decryption 304 engines are provided for write/read data optimized for throughput/latency. Separate tweak encrypt engines 312, 354 are provided for write/read paths, optimized first for area and then for latency and then for throughput of data encryption/decryption engines. With described embodiments, the base tweak may be formed from a memory physical address and the channel address to form a fixed bit length value, such as 128 bits. Alternatively, the logical device address may be used instead of the physical address to allow for wear-leveling at the memory storage without requiring a decrypt and re-encrypt of the data moved during wear leveling.

Described embodiments further detach the tweak encryption from the read flow, to ensure minimal latency impact to read transactions, hiding the entire tweak generation time. Further, the tweak generation time may be hidden for reads with a simple per in-order channel tweak queue and tweak generation may be hidden for reads with a buffer that may provide multiple base tweaks for different channels in a multi-channel memory to handle out-of-order transactions. Further, tweak generation effects on timing may be hidden by performing the tweak calculation while the error correction code (ECC) operation is performed on the data so the tweak is generated just-in-time for the data being outputted from the ECC operation, without requiring any buffering. Described embodiments further provide support for multiple keys for different regions (e.g. a persistent and volatile region) and a fully pipelined encryption/decryption engine implementation by providing multiple instantiations of the encryption logic to allow parallel processing of encryption operations.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The described operations of the memory controller 102 and the logic components 106, 108, 110, and 114, may be implemented as a method, apparatus or computer readable storage medium using standard programming and/or engineering techniques to produce software, firmware, hardware, or any combination thereof. The described operations may be implemented as code or logic maintained in a "computer readable storage medium", which may directly execute the functions or where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory storages (e.g., EEPROMs, ROMs, PROMs, RAMs, DRAMs, SRAMs, Flash Memory, firmware, programmable logic, etc.), Solid State Devices (SSD), etc. The computer readable storage medium may further comprise digital logic implemented in a hardware device (e.g., an integrated circuit chip, a programmable logic device, a Programmable Gate Array (PGA), field-programmable gate array (FPGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals. Those skilled in the art will recognize that many modifications may be made to this configuration without departing from the scope of the present invention, and that the article of manufacture may comprise suitable information bearing medium known in the art.

EXAMPLES

The following examples pertain to further embodiments.

Example 1 is a memory system, comprising: memory storage; and a memory controller including logic to perform operations, the operations comprising: generating a base tweak as a function of an address of a block of data in the memory storage; for each sub-block of the block, performing: processing the base tweak to determine a sub-block tweak; combining the sub-block tweak with the sub-block to produce a modified sub-block; and performing an encryption operation comprising one of encryption or decryption on the modified sub-block to produce sub-block output comprising one of encrypted data and unencrypted data for the sub-block.

In Example 2, the subject matter of Examples 1 and 3-13 can optionally include that operations further comprise encrypting the base tweak, wherein the sub-block tweaks are generated from the encrypted base tweak.

In Example 3, the subject matter of Examples 1-2 and 4-13 can optionally include that there are multiple encryption keys maintained for different areas of the memory storage, wherein the encrypting the base tweak comprises selecting a selected encryption key from the multiple encryption keys for the area of the memory storage including the address subject to the encryption operation, wherein the selected encryption key is used to encrypt or decrypt the base tweak.

In Example 4, the subject matter of Examples 1-3 and 5-13 can optionally include that the processing the base tweak comprises applying a function to the base tweak to produce each of the sub-block tweaks, wherein the function takes as a parameter a number of the sub-block of the block at the address on which to perform the encryption operation, and wherein each of the sub-block tweaks has a different effect on the sub-block when combined with the sub-block.

In Example 5, the subject matter of Examples 1-4 and 6-13 can optionally include that the operations for each sub-block comprise combining the sub-block tweak with the sub-block output to produce the encrypted data or the decrypted data for the sub-block.

In Example 6, the subject matter of Examples 1-5 and 7-13 can optionally include that the address from which the base tweak is generated comprises one of a physical address in the memory storage and a logical address of the block.

In Example 7, the subject matter of Examples 1-6 and 8-13 can optionally include that the generating the base tweak further comprises padding the physical or logical address to produce the base tweak having a fixed number of bits and encrypting the padded physical or logical address to produce the base tweak.

In Example 8, the subject matter of Examples 1-7 and 9-13 can optionally include that the sub-block tweaks are generated to be available at a time when the sub-blocks for the address are made available for combining with the sub-block tweaks.

In Example 9, the subject matter of Examples 1-8 and 10-13 can optionally include that the encryption logic includes: an encryption engine to generate the sub-block tweaks, produce the modified sub-blocks, perform the encryption operation on the modified sub-blocks to produce the sub-block outputs comprising the encrypted data to write to the address; and a decryption engine to generate the sub-block tweaks, produce the modified sub-blocks, perform the decryption operation on the modified sub-blocks to produce the sub-block outputs comprising the decrypted data to return to a read request.

In Example 10, the subject matter of Examples 1-9 and 11-13 can optionally include that the encryption engine comprises: a tweak queue; a tweak engine to generate the base tweak and store the base tweak in the tweak queue; and a decryption component to combine the sub-block tweak with the sub-blocks and perform the decryption operations, wherein the tweak queue provides the base tweak to the decryption component at a time when the sub-blocks to be combined with the sub-block tweaks are provided to the decryption component.

In Example 11, the subject matter of Examples 1-10 and 12-13 can optionally include that the tweak queue stores the base tweak for multiple blocks being processed at different channels, wherein the tweak engine when executed further performs using the channel of the received sub-block to select one of the base or subsequent tweaks in the tweak queue for the channels to provide to the decryption engine to combine with the encrypted sub-block.

In Example 12, the subject matter of Examples 1-11 and 13 can optionally include that the encryption logic includes: an encryption engine to perform the decryption and encryption operations; and a tweak engine to generate the base tweak, wherein the tweak engine provides the base tweak to the encryption engine, wherein the encryption engine determines the sub-block tweak to provide to combine when the sub-block is received.

In Example 13, the subject matter of Examples 1-12 can optionally include that the encryption engine performs a plurality of encryption operations on the modified sub-blocks to produce the sub-block outputs, wherein the encryption engine includes a plurality of duplicate instances of the logic to perform the encryption operations to allow pipelining of the modified sub-blocks to be simultaneously processed within the encryption engine.

Example 14 is a memory controller in communication with a memory storage, comprising: logic to perform operations, the operations comprising: generating a base tweak as a function of an address of a block of data in the memory storage; and for each sub-block of the block, performing: processing the base tweak to determine a sub-block tweak; combining the sub-block tweak with the sub-block to produce a modified sub-block; and performing an encryption operation comprising one of encryption or decryption on the modified sub-block to produce sub-block output comprising one of encrypted data and unencrypted data for the sub-block.

In Example 15, the subject matter of Examples 14 and 16-19 can optionally include that the operations further comprise encrypting the base tweak, wherein the sub-block tweaks are generated from the encrypted base tweak.

In Example 16, the subject matter of Examples 15 and 17-19 can optionally include that the processing the base tweak comprises: applying a function to the base tweak to produce each of the sub-block tweaks, wherein the function takes as a parameter a number of the sub-block of the block at the address on which to perform the encryption operation, and wherein each of the sub-block tweaks has a different effect on the sub-block when combined with the sub-block.

In Example 17, the subject matter of Examples 14-16 and 18-19 can optionally include that the address from which the base tweak is generated comprises one of a physical address in the memory storage and a logical address of the block.

In Example 18, the subject matter of Examples 14-17 and 19 can optionally include that the encryption logic includes: an encryption engine to generate the sub-block tweaks, produce the modified sub-blocks, perform the encryption operation on the modified sub-blocks to produce the sub-block outputs comprising the encrypted data to write to the address; and a decryption engine to generate the sub-block tweaks, produce the modified sub-blocks, perform the decryption operation on the modified sub-blocks to produce the sub-block outputs comprising the decrypted data to return to a read request.

In Example 19, the subject matter of Examples 14-18 can optionally include that the encryption logic includes: an encryption engine to perform the decryption and encryption operations; and a tweak engine to generate the base tweak, wherein the tweak engine provides the base tweak to the encryption engine, wherein the encryption engine determines the sub-block tweak to provide to combine when the sub-block is received.

Example 20 is a method for encrypting and decrypting data in a memory storage, comprising: generating a base tweak as a function of an address of a block of data in the memory storage; and for each sub-block of the block, performing: processing the base tweak to determine a sub-block tweak; combining the sub-block tweak with the sub-block to produce a modified sub-block; and performing an encryption operation comprising one of encryption or decryption on the modified sub-block to produce sub-block output comprising one of encrypted and unencrypted data for the sub-block.

In Example 21, the subject matter of Examples 20 and 22-25 can optionally include encrypting the base tweak, wherein the sub-block tweaks are generated from the encrypted base tweak.

In Example 22, the subject matter of Examples 20-21 and 23-25 can optionally include that there are multiple encryption keys maintained for different areas of the memory storage, wherein the encrypting the base tweak comprises: selecting a selected encryption key from the multiple encryption keys for the area of the memory storage including the address subject to the encryption operation, wherein the selected encryption key is used to encrypt or decrypt the base tweak.

In Example 23, the subject matter of Examples 20-22 and 24-25 can optionally include that the processing the base tweak comprises: applying a function to the base tweak to produce each of the sub-block tweaks, wherein the function takes as a parameter a number of the sub-block of the block at the address on which to perform the encryption operation, and wherein each of the sub-block tweaks has a different effect on the sub-block when combined with the sub-block.

In Example 24, the subject matter of Examples 20-22 and 25 can optionally include that the address from which the base tweak is generated comprises one of a physical address in the memory storage and a logical address of the block.

In Example 25, the subject matter of Examples 20-24 can optionally include that the sub-block tweaks are generated to be available at a time when the sub-blocks for the address are made available for combining with the sub-block tweaks.

Example 26 is a memory controller in communication with a memory storage, comprising: means to generate a base tweak as a function of an address of a block of data in the memory storage; and means for performing for each sub-block of the block: processing the base tweak to determine a sub-block tweak; combining the sub-block tweak with the sub-block to produce a modified sub-block; and performing an encryption operation comprising one of encryption or decryption on the modified sub-block to produce sub-block output comprising one of encrypted data and unencrypted data for the sub-block.

In Example 27, the subject matter of Examples 26 can optionally include that the means for processing the base tweak further comprises: means for applying a function to the base tweak to produce each of the sub-block tweaks, wherein the function takes as a parameter a number of the sub-block of the block at the address on which to perform the encryption operation, and wherein each of the sub-block tweaks has a different effect on the sub-block when combined with the sub-block.

What is claimed:
1. A memory system, comprising:
   memory storage array to store blocks of data, wherein each block is comprised of sub-blocks of data; and
   a memory controller including logic to:
      generate a base tweak as a function of an address of a block of data in the memory storage array, wherein the address of the block of data comprises a logical or physical address in the memory storage array;
      select an encryption key from multiple encryption keys for different areas of the memory storage array, wherein the selected encryption key is for an area of the different areas of the memory storage array including the address of the block of data;
      generate an encrypted base tweak using the selected encryption key;
      for each sub-block of the sub-blocks of the block of data at the address, the memory controller repeats operations that:
         set a variable to a number indicating a position of the sub-block in the block of data at the address in the memory storage array;
         apply a function to the encrypted base tweak that takes as a parameter the variable to determine an encrypted sub-block tweak based on the variable indicating the position of the sub-block in the block of data;
         encrypt the sub-block; and
         combine the encrypted sub-block tweak with the encrypted sub-block to produce encrypted sub-block output to write to the memory storage array.
2. The memory system of claim 1, wherein the memory controller further performs for each sub-block:

read an encrypted sub-block;
combine the encrypted sub-block tweak with the encrypted sub-block to produce a modified encrypted sub-block; and
apply an encryption key to decrypt the modified encrypted sub-block to produce a decrypted sub-block.

3. The memory system of claim 1, wherein the address from which the base tweak is generated comprises one of a physical address in the memory storage array and a logical address of the block of data.

4. The memory system of claim 3, wherein to generate the base tweak pads the physical or logical address to produce the base tweak having a fixed number of bits and encrypting the padded physical or logical address to produce the base tweak.

5. The memory system of claim 1, wherein encrypted sub-block tweaks are generated to be available at a time when the sub-blocks for the address are made available for combining with the encrypted sub-block tweaks.

6. The memory system for claim 1, further comprising:
an encryption engine to generate encrypted sub-block tweaks, encrypt sub-blocks, and produce encrypted sub-block output; and
a decryption engine to perform decryption on the encrypted sub-block output to produce decrypted sub-blocks.

7. The memory system of claim 6, wherein the encryption engine comprises:
a tweak queue;
a tweak engine to generate the base tweak and store the base tweak in the tweak queue; and
a decryption component to combine the encrypted sub-block tweaks with the encrypted sub-blocks and perform the decryption, wherein the tweak queue provides the base tweak to the decryption component at a time when the encrypted sub-blocks to be combined with the encrypted sub-block tweaks are provided to the decryption component.

8. The memory system of claim 7, wherein the tweak queue stores the base tweak for multiple blocks being processed at different channels, wherein the tweak engine is further to:
use a channel of the sub-block to select one of the base tweak or subsequent tweaks in the tweak queue for the channels to provide to the decryption engine to combine with the encrypted sub-block.

9. The memory system of claim 1, further comprising:
an encryption engine to perform decryption and encryption operations; and
a tweak engine to generate the base tweak, wherein the tweak engine provides the base tweak to the encryption engine, wherein the encryption engine determines the encrypted sub-block tweak to provide to combine when the sub-block is received.

10. The memory system of claim 9, wherein the encryption engine performs a plurality of encryption operations on the sub-blocks to produce encrypted sub-blocks, wherein the encryption engine includes a plurality of duplicate instances of the logic to perform the encryption operations to allow pipelining of the sub-blocks to be simultaneously processed within the encryption engine.

11. A memory controller in communication with a memory storage array, comprising: logic to:
generate a base tweak as a function of an address of a block of data in the memory storage array, wherein the address of the block of data comprises a logical or physical address in the memory storage array storing blocks of data, wherein each block is comprised of sub-blocks of data;
select an encryption key from multiple encryption keys for different areas of the memory storage array, wherein the selected encryption key is for an area of the different areas of the memory storage array including the address of the block of data;
generate an encrypted base tweak using the selected encryption key; and
for each sub-block of the sub-blocks of the block of data at the address, the logic repeats operations to :
set a variable to a number indicating a position of the sub-block in the block of data at the address in the memory storage array;
apply a function to the encrypted base tweak to that takes as a parameter the variable to determine an encrypted sub-block tweak based on the variable indicating the position of the sub-block;
encrypt the sub-block; and
combine the encrypted sub-block tweak with the encrypted sub-block to produce encrypted sub-block output to write to the memory storage array.

12. The memory controller of claim 11, wherein the address from which the base tweak is generated comprises one of a physical address in the memory storage array and a logical address of the block of data.

13. The memory controller of claim 11, further comprising:
an encryption engine to generate encrypted sub-block tweaks, encrypt sub-blocks, and produce encrypted sub-block output; and
a decryption engine to perform decryption on the encrypted sub block output to produce decrypted sub-blocks.

14. The memory controller of claim 11, further comprising:
an encryption engine to perform decryption and encryption operations; and
a tweak engine to generate the base tweak, wherein the tweak engine provides the base tweak to the encryption engine, wherein the encryption engine determines the encrypted sub-block tweak to provide to combine when the sub-block is received.

15. A method, comprising:
generating a base tweak as a function of an address of a block of data in a memory storage array, wherein the address of the block of data comprises a logical or physical address in the memory storage array storing blocks of data, wherein each block is comprised of sub-blocks of data;
selecting an encryption key from multiple encryption keys for different areas of the memory storage array, wherein the selected encryption key is for an area of the different areas of the memory storage array including the address of the block of data;
generating an encrypted base tweak using the selected encryption key; and
for each sub-block of the sub-blocks of the block of data at the address, repeat performing for each of the sub-blocks:
setting a variable to a number associated with indicating a position of the sub-block in the block of data at the address in the memory storage array;
applying a function to the encrypted base tweak that takes as a parameter the variable to determine an encrypted sub-block tweak based on the variable indicating the position of the sub-block;

encrypt the sub-block; and combining the encrypted sub-block tweak with the encrypted sub-block to produce encrypted sub-block output to write to the memory storage array.

16. The method of claim 15, wherein the address from which the base tweak is generated comprises one of a physical address in the memory storage array and a logical address of the block of data.

17. The method of claim 15, wherein encrypted sub-block tweaks are generated to be available at a time when the sub-blocks for the address are made available for combining with the encrypted sub-block tweaks.

18. The memory system of claim 1, wherein the memory controller is further to:

provide on a same clock cycle the encrypted sub-block tweak and the sub-block to an adder to perform the combine of the encrypted sub-block tweak with the sub-block.

19. The memory controller of claim 11, wherein the logic is further to:

provide on a same clock cycle the encrypted sub-block tweak and the sub-block to an adder to perform the combine of the encrypted sub-block tweak with the sub-block.

20. The method of claim 15, further comprising:

providing on a same clock cycle the encrypted sub-block tweak and the sub-block to an adder to combine the encrypted sub-block tweak with the sub-block.

21. The memory controller of claim 11, to further perform for each sub-block:

read an encrypted sub-block;

combine the encrypted sub-block tweak with the encrypted sub-block to produce a modified encrypted sub-block; and apply an encryption key to decrypt the modified encrypted sub-block to produce a decrypted sub-block.

22. The method of claim 15, further performing for each sub-block:

reading an encrypted sub-block;

combining the encrypted sub-block tweak with the encrypted sub-block to produce a modified encrypted sub-block; and applying an encryption key to decrypt the modified encrypted sub-block to produce a decrypted sub-block.

* * * * *